(12) United States Patent
Schroeder

(10) Patent No.: US 7,050,670 B2
(45) Date of Patent: May 23, 2006

(54) METHOD AND SYSTEM FOR ALIGNING AND MAINTAINING ALIGNMENT OF AN OPTICAL SWITCH USING SENSORS

(75) Inventor: Dale W. Schroeder, Scotts Valley, CA (US)

(73) Assignee: Avago Technologies, Singapore (SG)

( * ) Notice: Subject to any disclaimer, the term of this patent is extended or adjusted under 35 U.S.C. 154(b) by 167 days.

(21) Appl. No.: 10/638,139

(22) Filed: Aug. 7, 2003

(65) Prior Publication Data

US 2005/0031251 A1    Feb. 10, 2005

(51) Int. Cl.
*G02B 6/35* (2006.01)
(52) U.S. Cl. .......................................... 385/18; 385/17
(58) Field of Classification Search ............. 385/16–18
See application file for complete search history.

(56) References Cited

U.S. PATENT DOCUMENTS

| | | | |
|---|---|---|---|
| 5,914,801 A | 6/1999 | Dhuler et al. | |
| 5,986,381 A | 11/1999 | Hoen et al. | |
| 5,998,906 A | 12/1999 | Jerman et al. | |
| 6,087,747 A | 7/2000 | Dhuler et al. | |
| 6,134,042 A | 10/2000 | Dhuler et al. | |
| 6,362,556 B1 | 3/2002 | Hoen | |
| 6,529,652 B1 * | 3/2003 | Brener | 385/16 |
| 6,539,142 B1 | 3/2003 | Lemoff et al. | |
| 6,545,385 B1 | 4/2003 | Miller et al. | |
| 6,580,846 B1 * | 6/2003 | Burroughs et al. | 385/16 |
| 2004/0091200 A1 * | 5/2004 | Ikegame | 385/18 |

FOREIGN PATENT DOCUMENTS

EP    1 206 159 A2    5/2002

* cited by examiner

*Primary Examiner*—John D. Lee
*Assistant Examiner*—Mike Stahl

(57) ABSTRACT

A pair of directing elements directs a beam of light into a corresponding optical output from a corresponding optical input. Examples of a pair of directing elements include a pair of tilting mirrors and a pair of support devices. Sensors may be positioned adjacent to the optical output, one directing element, and to both directing elements. Each sensor detects an amount of light hitting that sensor and generates a signal representative of the amount of light hitting that sensor. A controller receives the signal from each sensor and generates one or more correction signals. A correction signal causes a corresponding directing element to be adjusted in order to minimize losses in optical signal power.

16 Claims, 9 Drawing Sheets

FIG. 1 - Prior Art

METHOD AND SYSTEM FOR ALIGNING AND MAINTAINING ALIGNMENT OF AN OPTICAL SWITCH USING SENSORS

TECHNICAL FIELD

The invention relates generally to optical communications, and more particularly to optical switches. Still more particularly, the invention relates to a method and system for aligning and maintaining alignment of an optical switch using sensors.

BACKGROUND

Recent and ongoing innovations in fiber optic technology have resulted in the increased use of optical fibers in a number of applications, including optical communications. This increased use has led to a need for efficient peripheral devices that assist in the transmission of data through the optical fibers. One such peripheral device is an optical switch. An optical switch operates to selectively couple one optical fiber to a second optical fiber such that the coupled optical fibers are in communication with each other.

Two optical fibers in an optical switch can be coupled together with micro-machined tilting mirrors, or microelectromechanical system (MEMS) tilting mirrors, to direct a beam of light from an input optical fiber to an output optical fiber. The alignment of the tilting mirrors is critical to the performance of an optical switch. Each tilting mirror must be precisely aligned to receive a beam of light from, or transmit a beam of light into, a corresponding optical fiber. When one or more tilting mirrors are out of alignment, less light enters an output optical fiber resulting in losses in optical signal power.

FIG. 1 illustrates a simplified diagrammatic side view of an alignment system in an optical switch according to the prior art. Optical switch 100 includes a collection of input optical fibers 102, output optical fibers 104, input lenses 106, and output lenses 108. A fixed mirror 110 is positioned between and opposing two arrays of micro-machined tilting mirrors 112, 114. The alignment of optical switch 100 is maintained by transmitting an alignment beam of light 118 from a test light source 116 to a directional optical coupler 120. The coupler 120 injects the alignment beam 118 into a data information beam of light 122 propagating through optical switch 100. The two beams of light 118, 122 propagate through the optical switch and, upon exiting an output fiber 124, are received by a directional coupler 126.

Typically, the alignment beam of light 118 has a wavelength band different from that of the data information beam of light 122 in order to render the alignment beam 118 discernible from the data information beam 122. Accordingly, the directional coupler 126 directs the alignment beam of light 118 onto a detector 128, which generates a signal representative of the alignment beam of light 118. The detector 128 transmits the signal to a controller 130, which determines the accuracy of the alignment for the pair of tilting mirrors 132, 134. The controller 130 generates compensation signals that are fed back to actuators 136, 138 connected to tilting mirrors 132, 134 respectively, to cause actuators 136, 138 to adjust the tilt of the mirrors 132, 134 to minimize losses in signal power.

The alignment system of FIG. 1 requires a large total number of test light sources, directional optical couplers, and detectors to align the optical switch. A coupler is needed for each input and each output optical fiber in the switch, a detector is needed for each output fiber, and a test light source is needed for each input fiber. The alignment system of FIG. 1 also requires a considerable amount of time to align the switch, since individual pairs of tilting mirrors are adjusted independently.

SUMMARY

In accordance with the invention, a method and system for aligning and maintaining alignment of an optical switch using sensors is provided. A pair of directing elements directs a beam of light into a respective optical output from a respective optical input. In one embodiment in accordance with the invention, the pair of directing elements includes a pair of tilting mirrors. In another embodiment in accordance with the invention, the two directing elements comprise two support devices, one for creating a bend in the optical input and one for creating a bend in the optical output. The bend in the optical input directs a beam of light toward the optical output while the bend in the optical output positions the input end of the optical output in the best position to receive the beam of light.

To align and maintain the alignment of an optical switch, sensors may be positioned adjacent to the optical output, to one directing element, and to both directing elements. Each sensor detects an amount of light hitting that sensor and generates a signal representative of the amount of light hitting that sensor. A controller receives the signal from each sensor and generates one or more correction signals. A correction signal causes a respective directing element to be adjusted in order to minimize losses in optical signal power.

BRIEF DESCRIPTION OF THE DRAWINGS

The invention will best be understood by reference to the following detailed description of embodiments in accordance with the invention when read in conjunction with the accompanying drawings, wherein.

DETAILED DESCRIPTION

The invention relates to a method and system for aligning and maintaining alignment of an optical switch using sensors. The following description is presented to enable one skilled in the art to make and use the invention, and is provided in the context of a patent application and its requirements. Various modifications to the disclosed embodiments will be readily apparent to those skilled in the art, and the generic principles herein may be applied to other embodiments. Thus, the invention is not intended to be limited to the embodiments shown, but is to be accorded the widest scope consistent with the appended claims and with the principles and features described herein.

Figure 1:
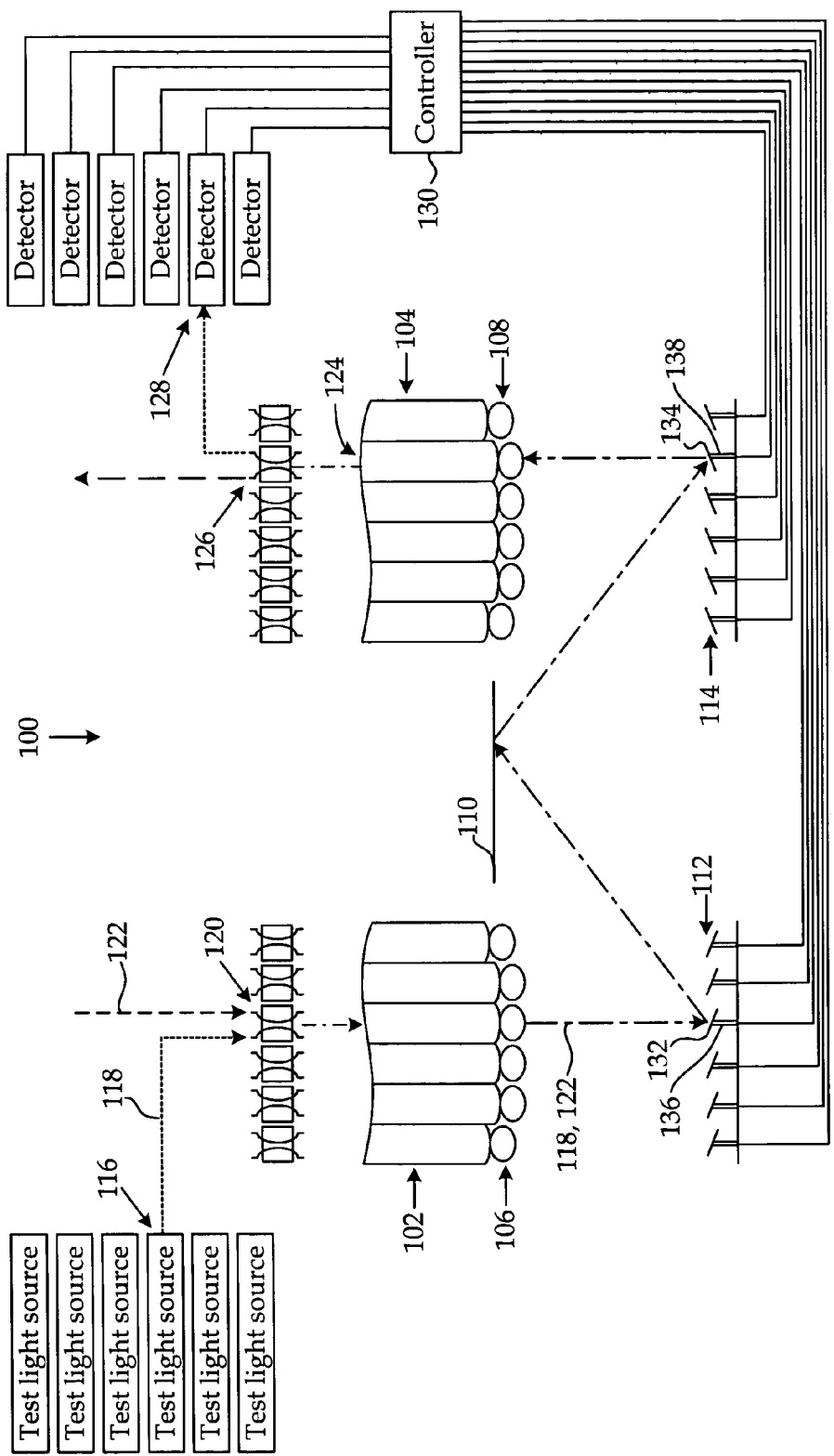
FIG. 1 is a simplified diagrammatic side view of an alignment system in an optical switch according to the prior art.
Figure 2:
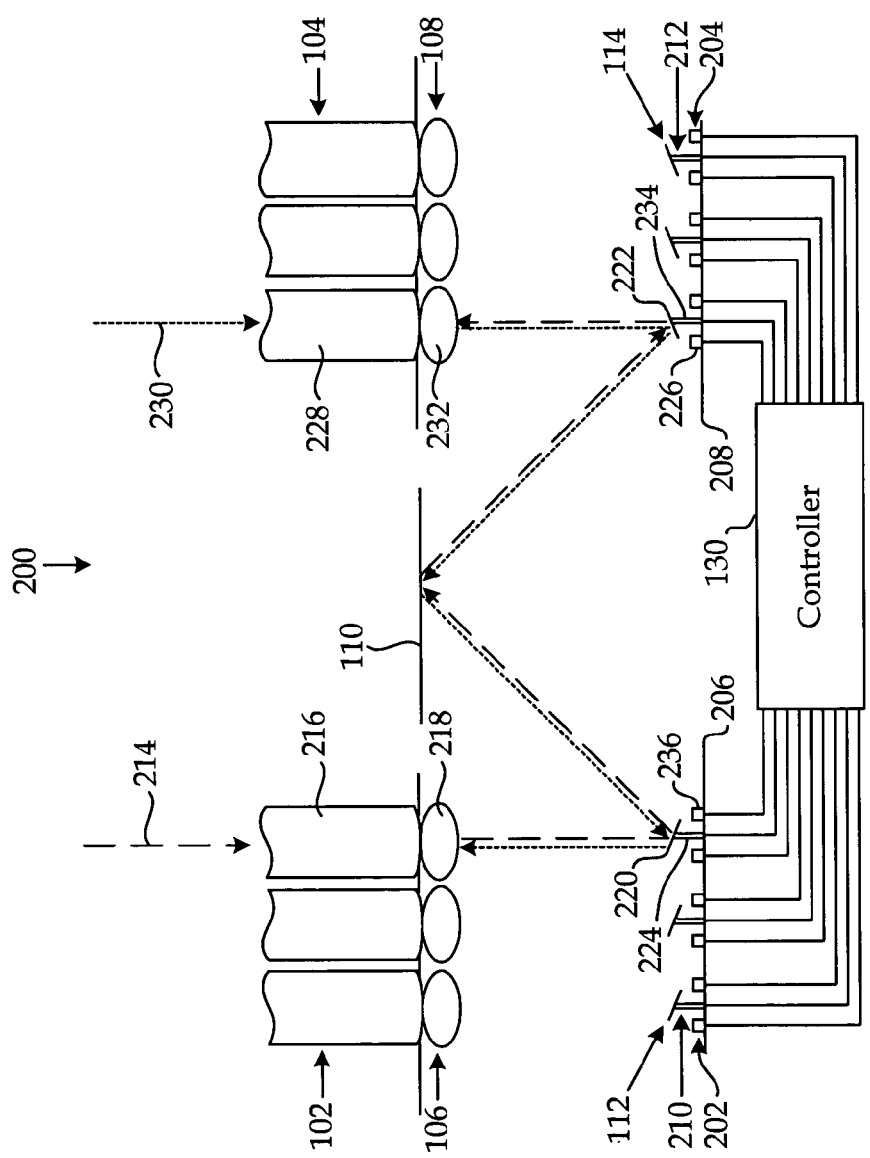
FIG. 2 is a simplified diagrammatic side view of an optical switch in a first embodiment accordance with the invention.

With reference now to the figures and in particular with reference to FIG. 2, there is shown a simplified diagrammatic side view of an optical switch in a first embodiment in accordance with the invention. Optical switch 200 includes input optical fibers 102, output optical fibers 104, input lenses 106, and output lenses 108. A fixed mirror 110 is positioned between and opposing two arrays of micromachined tilting mirrors 112, 114. The input optical fibers 102 and the output optical fibers 104 are held in a conventional alignment device or coupling mechanism (not shown).

Each tilting mirror in array 112 and a respective one of tilting mirrors in array 114 operate as directing elements to direct a corresponding beam of light through the optical switch. In this embodiment in accordance with the invention, a collection of sensors 202, 204 are fabricated or constructed in tiles 206, 208, respectively, supporting the arrays of tilting mirrors 112, 114. Sensors 202, 204 are optical-to-electrical converters such as, for example, photodiodes. The tiles 206, 208 are substrate wafers such as, for example, silicon wafers, in the FIG. 2 embodiment. Tilting mirrors 112, 114 and sensors 202, 204 may be constructed using known fabrication techniques, such as microelectromechanical (MEMS) fabrication methods.

The sensors may be used to initially align corresponding tilting mirrors and to maintain the alignment of the tilting mirrors in relation to their corresponding optical fibers. Each sensor is connected to a controller 130, and the controller 130 is connected to each actuator in the two arrays of actuators 210, 212. The actuators may be constructed as any known positioning device, including, but not limited to, thermal actuators, piezoelectric actuators, and MEMS electrostatic actuators.

During the initial alignment of optical switch 200, a beam of light 214 is transmitted into an input optical fiber 216 and input lens 218. Input lens 218 focuses the beam of light 214 onto a corresponding tilting mirror 220 in array 112. The tilting mirror 220 reflects the beam of light 214 onto a particular point on fixed mirror 110, and fixed mirror 110 reflects the beam 214 onto a corresponding tilting mirror 222 in array 114. During this process, tilting mirror 220 is swept through its complete tilting range by a corresponding actuator 224. The sensors 226 adjacent to tilting mirror 222 in the second array 114 are used to determine the proper tilting position for the tilting mirror 220 in the first array 112. In the FIG. 2 embodiment, tilting mirror 220 is positioned so that the beam of light 214 hits tilting mirror 222 in a location that maximizes the amount of light entering the output fiber 228. When the light drifts off tilting mirror 222, less light enters output fiber 228 causing losses in optical signal power.

Alignment of the second array of tilting mirrors 114 occurs in a similar manner. A beam of light 230 is transmitted through an output optical fiber 228 and output lens 232. Output lens 232 focuses the beam of light 230 onto the tilting mirror 222 in array 114. Tilting mirror 222 reflects the beam of light 228 onto fixed mirror 110, and fixed mirror 110 reflects the beam 230 onto tilting mirror 220 in array 112. During this process, tilting mirror 222 is swept through its complete tilting range by a corresponding actuator 234. The sensors 236 adjacent tilting mirror 220 are utilized to determine the proper tilting position for tilting mirror 222.

The initial alignment of the remaining tilting mirrors in arrays 112 and 114 is completed using the same process as described above. A look up table (see FIG. 3) containing data values for each drive signal value input into an actuator associated with array 112 versus the position of the light beam on a corresponding tilting mirror in array 114 (as determined by the sensors) is created. The look up table also contains data values for each drive signal value input into an actuator associated with array 114 versus the position of the light beam on a corresponding tilting mirror in array 112. The data values in the lookup table may then be used to adjust the alignment of one or more tilting mirrors at a later time.

Although only one beam of light 214 is shown traveling from input fiber 216 to output fiber 228, there are in actuality a number of beams propagating through optical switch 200. In this embodiment in accordance with the invention, the beams of light propagate through the switch 200 in a left to right direction (from input fibers to output fibers). Therefore, the sensors 204 fabricated in tile 208 may be utilized to maintain the alignment of tilting mirrors 112 by continuously, or at intermittent time periods, detecting the amount of light hitting each sensor surrounding, or adjacent to, a particular tilting mirror or a group of tilting mirrors.

For example, when the sensors 226 adjacent tilting mirror 222 detect a portion of the beam of light 214, each sensor generates a signal representative of the amount of light hitting that sensor. These signals are input into controller 130, which computes how far the beam of light 214 has drifted from its desired position. The controller 130 generates a correction signal for tilting mirror 220 when tilting mirror 220 is out of alignment. A correction signal causes the actuator 224 connected to tilting mirror 220 to adjust the tilt the mirror 220 in order to minimize the amount of light detected by the sensors 226. In other embodiments in accordance with the invention, sensors 202 may be used to maintain the alignment of tilting mirrors 114 when the beams of light propagate through the switch in a right to left direction.

Embodiments in accordance with the invention, however, are not limited to the use of input and output optical fibers to propagate beams of light through an optical switch. Any desired optical components may be utilized to propagate light through an optical switch, such as, for example, waveguides formed in a substrate. Sensors may then be utilized to maintain the alignment of the optical switch in accordance with the invention.

Figure 3:
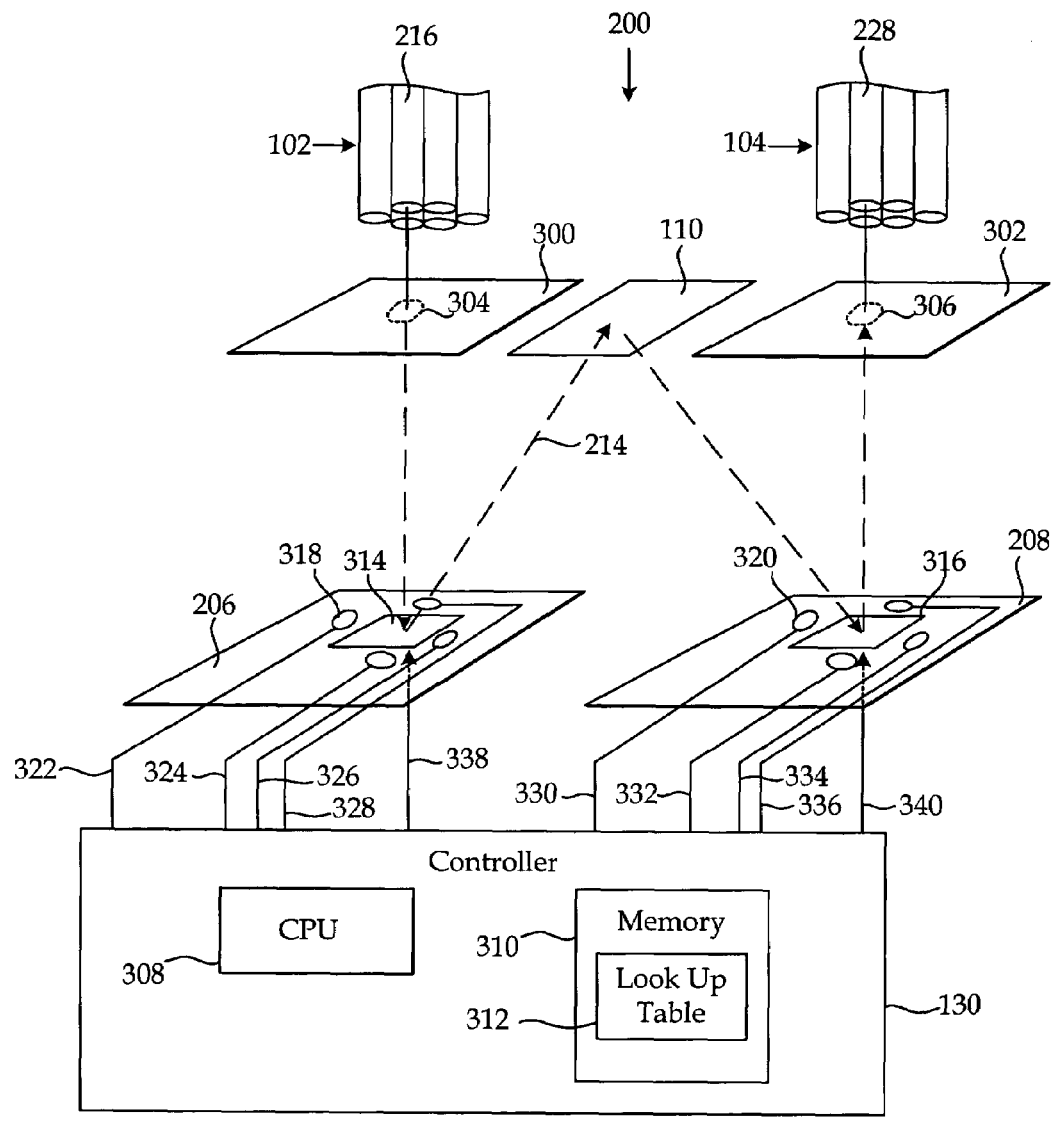
FIG. 3 is a simplified perspective view of the optical switch of FIG. 2.

FIG. 3 is a simplified perspective view of the optical switch of FIG. 2. The input optical fibers 102 are affixed or supported by a first substrate 300, and the output optical fibers 104 are affixed or supported by a second substrate 302. Input fiber 216 is affixed in an aperture 304 formed in substrate 300 and output fiber 228 is affixed in an aperture 306 formed in substrate 302. Apertures 304, 306 may be formed using any known fabrication technique, including, but not limited to, chemical etching.

Controller 130 is configured as a computer in the FIG. 3 embodiment. Controller 130 includes, but is not limited to, a central processing unit 308, a memory 310, and a look up table 312 stored in memory 310. The look up table 312 stores the data values determined during the initial alignment process. The controller 130 uses these data values to maintain the alignment of optical switch 200.

A beam of light 214 is received by a first tilting mirror 314 and is reflected onto fixed mirror 110. Fixed mirror 110 reflects the beam of light 214 onto a second tilting mirror 316. The second tilting mirror 316 reflects the beam of light into output fiber 228. A set of four sensors 318 is adjacent tilting mirror 314 and another set of four sensors 320 is adjacent tilting mirror 316. When a portion of the beam of light 214 hits a particular sensor, the sensor transmits a signal to the controller 130 via a corresponding one of signal lines 322, 324, 326, 328, 330, 332, 334, 336. The controller 130 uses these signals, along with the data values in look up table 312, to determine the proper tilt for the tilting mirrors 314, 316. The controller 130 computes how far a beam of light has drifted from its desired position and, if one or both mirrors are out of alignment, generates a correction signal for one or both tilting mirrors 314, 316. A correction signal is transmitted to a corresponding actuator (not shown) via signal line 338 or 340. The correction signal causes the actuator connected to a particular tilting mirror to adjust the tilt of the mirror in order to minimize the amount of light detected by the sensors.

Figure 4:
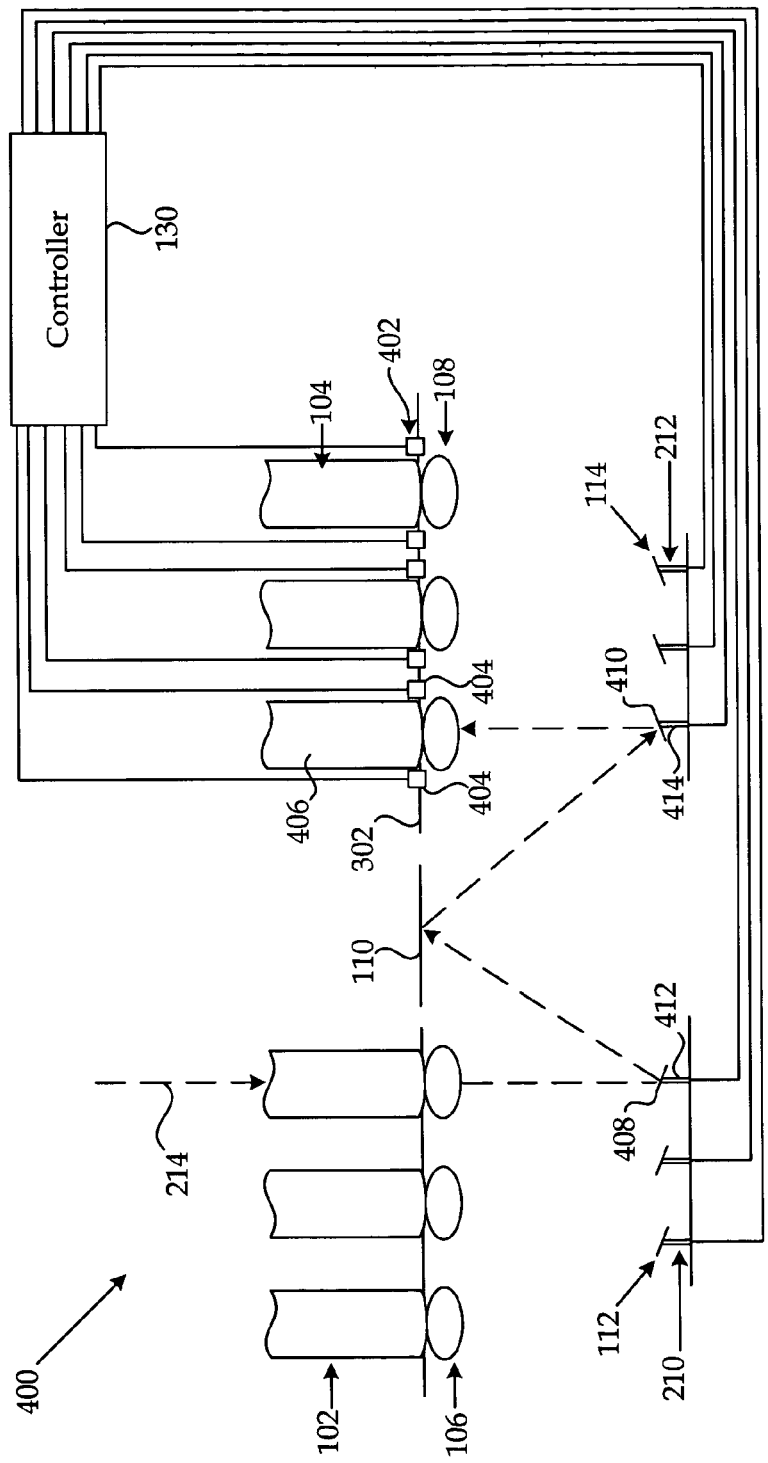
FIG. 4 is a simplified diagrammatic side view of an optical switch in a second embodiment in accordance with the invention.

Referring to FIG. 4, there is shown a simplified diagrammatic side view of an optical switch in a second embodiment in accordance with the invention. Optical switch 400 includes input optical fibers 102, output optical fibers 104, input lenses 106, and output lenses 108. A fixed mirror 110 is positioned between the two arrays of micro-machined tilting mirrors 112, 114. The input optical fibers 102 and the output optical fibers 104 are held in a conventional alignment device or coupling mechanism (not shown).

In this embodiment in accordance with the invention, sensors 402 are utilized to detect if beams of light have drifted away from the input of corresponding output optical fibers. Each sensor 502 is connected to a controller 130, and the controller 130 is connected to actuators 210 and 212 associated with the arrays of tilting mirrors 112, 114. Sensors 502 are utilized to maintain the alignment of optical switch 400 by continuously, or at intermittent time periods, detecting the amount of light hitting each sensor. Each sensor then generates a signal representative of the amount of light hitting that sensor.

For example, when the sensors 404 adjacent output fiber 406 detect a portion of the beam of light 214, each sensor generates a signal representative of the amount of light hitting that sensor. These signals are input into controller 130, which computes how far the beam of light 214 has drifted from the input end of output fiber 406. The controller 130 generates a correction signal that represents an adjustment to the tilting mirror 408 or 410. A correction signal cause a corresponding actuator 412 or 414 to adjust the tilt of the mirror in order to maximize the amount of light entering output optical fiber 406.

Figure 5:
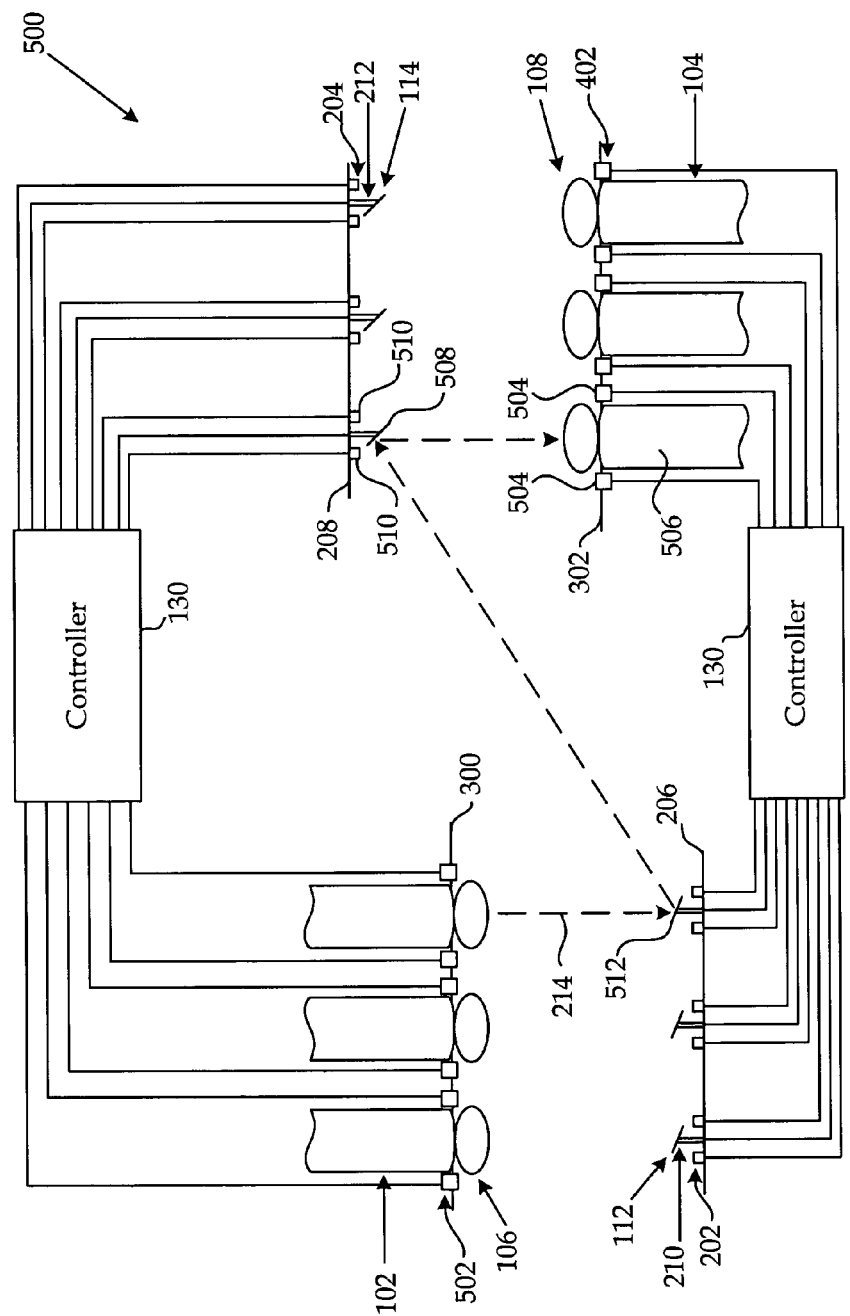
FIG. 5 is a simplified diagrammatic side view of an optical switch in a third embodiment in accordance with the invention.

FIG. 5 is a simplified diagrammatic side view of an optical switch in a third embodiment in accordance with the invention. Optical switch 500 includes input optical fibers 102, output optical fibers 104, input lenses 106, and output lenses 108. Sensors 202 are fabricated or constructed in tile 206, sensors 204 are fabricated or constructed in tile 208, sensors 502 are fabricated or constructed in substrate 300, and sensors 402 are fabricated or constructed in substrate 302. The input optical fibers 102 and the output optical fiber 104 are held in a conventional alignment device or coupling mechanism (not shown).

Controller 130 may be configured as one individual controller or may comprise two or more separate controllers. For clarity, controller 130 is shown on opposing sides of optical switch 500 in FIG. 5. Sensors 202, 204 may be utilized to determine the initial alignment of the tilting mirrors pursuant to the method described in conjunction with the FIG. 2 embodiment. Sensors 502 and 202 may be used to maintain the alignment of an optical switch in those embodiments where the beams of light propagate through the switch in a right-to-left direction.

In this embodiment in accordance with the invention, beams of light propagate through the switch 500 in a left-to-right direction. Therefore, sensors 402 are used to maintain the alignment of tilting mirrors 114 and sensors 204 are used to maintain the alignment of tilting mirrors 112 during the operation of optical switch 500. For example, sensors 504 adjacent to output fiber 506 detect an amount of light from beam of light 214 hitting each sensor. Each sensor 504 then generates a signal representative of the amount of light hitting that sensor, and controller 130 generates a correction signal for tilting mirror 508. Sensors 510 adjacent tilting mirror 508 detect an amount of light from the beam of light 214 hitting each sensor. Each sensor 510 then generates a signal representative of the amount of light hitting that sensor and controller 130 generates a correction signal for tilting mirror 512.

Figure 6:
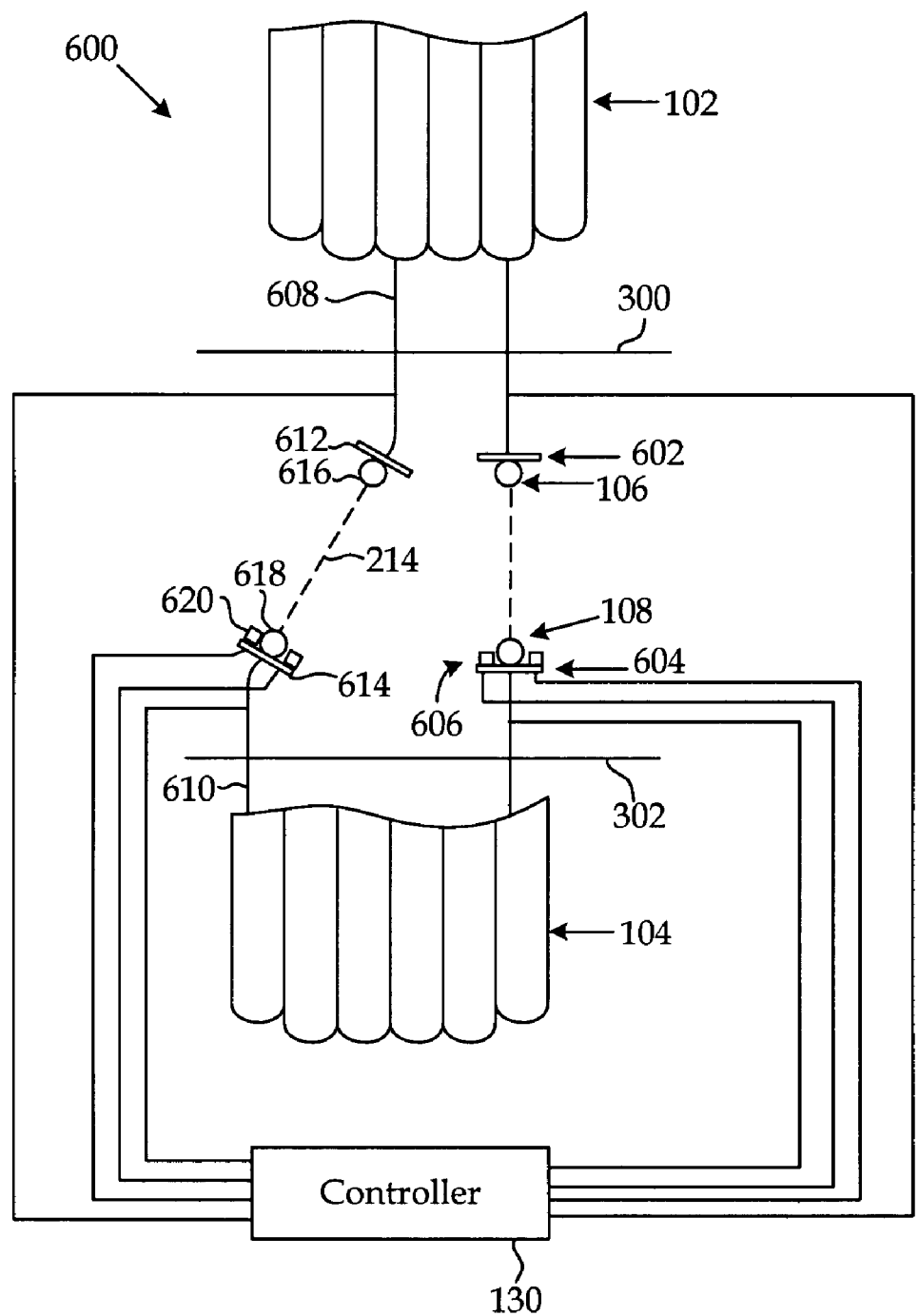
FIG. 6 is a simplified diagrammatic side view of an optical switch in a fourth embodiment in accordance with the invention.

Referring to FIG. 6, there is shown a simplified diagrammatic side view of an optical switch in a fourth embodiment in accordance with the invention. Optical switch 600 includes input optical fibers 102, output optical fibers 104, input lenses 106, output lenses 108, input support devices 602, and output support devices 604. The input fibers 102 are bonded to, or supported by, substrate layer 300, and the output fibers 104 are bonded to, or supported by, substrate layer 302. The input and output fibers 102, 104 may be unidirectional or bi-directional optical fibers, and are constructed with any known flexible material, such as for example, RC 1550 specialty fiber by Corning® or BIF-RC-1550-L2 bend insensitive fibers by StockerYale™. The flexible material allows one or more bends to be formed in each fiber.

The support devices 602, 604 operate as directing elements to direct corresponding beams of light through the optical switch. Each support device includes a positioning means to create a bend in a flexible fiber and direct a corresponding beam of light. In this embodiment in accordance with the invention, support devices 602, 604 may be fabricated to include one or more microelectromechanical (MEMS) devices, or may be fabricated as a support plate connected to one or more MEMS devices. Each MEMS device includes a pair of actuators, such as, for example, electrostatic actuators, thermal actuators, piezoelectric actuators, or electrostatic micromotors. The support devices 602, 604 are shown separately from substrates 300, 302 in FIG. 6 in order to better illustrate the support devices 602, 604. In practice, support devices 602 and 604 are typically formed or constructed within substrates 300 and 302, respectively, using known MEMS fabrication techniques.

Each optical fiber is connected to a support device in the FIG. 6 embodiment. An input fiber is optically coupled with an output fiber by selectively actuating or rotating one or both support devices to create a bend in one or both optical fibers and to place the lenses in the best position for transmitting or receiving a beam of light. A bend in a fiber is created by applying the forces generated by one or more actuators against a band of material surrounding a portion of the exterior surface of a fiber, causing the fiber to flex toward a desired point. In another embodiment in accordance with the invention, a bend in a fiber is created by applying the forces generated by one or more actuators to a support plate connected to the fiber, causing the support plate to rotate, or pivot, to a desired position.

A plurality of sensors 606 are fabricated or constructed in the support devices 704. The sensors 606 are utilized to detect if beam of lights have drifted from the input ends of corresponding output fibers. Each sensor is connected to a controller 130, and the controller 130 is connected to the actuators (now shown) associated with the input and output support devices 702, 704.

For simplicity, input optical fiber 608 and output optical fiber 610 will be used to describe this embodiment in accordance with invention. Input optical fiber 608 is optically coupled with the output fiber 610 by selectively actuating or rotating one or both support devices 612, 614 to create a bend in one or both optical fibers 608, 610 and to position lenses 616, 618 in the best position for transmitting or receiving the beam of light 214.

Sensors 620 detect if the beam of light 214 has drifted from the input end of output fiber 610. Sensors 620 generate signals representative of the amount of light hitting each sensor and transmit the signals to the controller 130. The controller then determines the accuracy of the alignment for input support device 612 and output support device 614. The controller 130 computes how far the beam of light 214 has drifted from its desired position and generates a correction signal for a particular support device when one or both support devices 612, 614 are out of alignment. A correction signal causes the actuators (not shown) in a support device 612 or 614 to adjust the bend in optical fiber 608 or 610, respectively, in order to maximize the amount of light entering output optical fiber 610.

Figure 7:
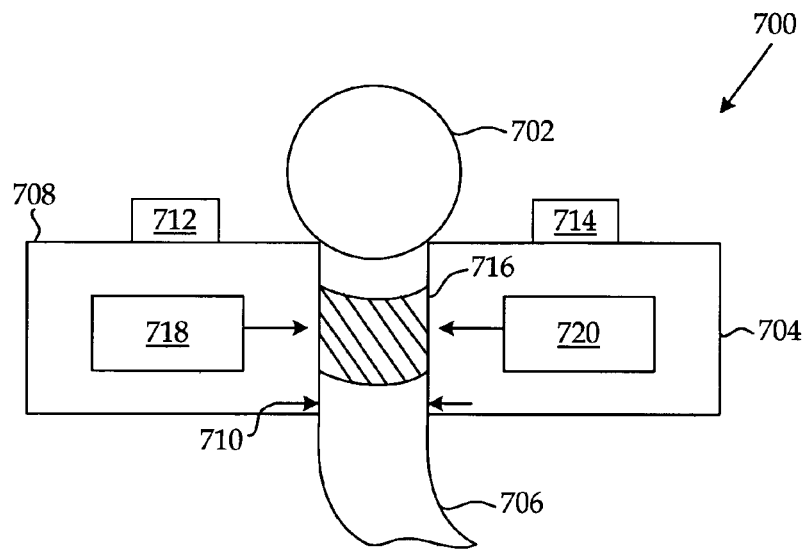
FIG. 7 depicts a simplified side view of a first embodiment of a lens, support device, and fiber construction that may be implemented in the optical switch of FIG. 6.

FIG. 7 depicts a simplified side view of a first embodiment of a lens, support device, and fiber construction that may be implemented in the optical switch of FIG. 6. Construction 700 includes a lens 702, a support device 704, and an optical fiber 706. Lens 702 is bonded to, or in contact with, a support surface 708 of support device 704 in this embodiment in accordance with the invention. Lens 702 is also aligned over, and bonded to, a terminating end of optical fiber 706. Optical fiber 706 extends through an aperture 710 formed in support device 704. Aperture 710 may be created using any known fabrication technique. For example, aperture 710 may be formed in support device 704 by micro-machining the substrate or by etching the substrate using any suitable etch technique.

Sensors 712, 714 are constructed in support device 704. A band of material 716 surrounds a portion of the optical fiber 706. A first actuator 718 generates a force along a first axis that may be applied to the band of material 716. A second actuator 720 generates a force along a second, perpendicular axis that may also be applied to the band of material 716. The two actuators 718, 720 permit three-dimensional bending of the optical fiber 706 and positioning of the lens 702. Embodiments in accordance with the invention, however, are not limited in application to the construction shown in FIG. 7. Any support device construction that permits a force to be applied to the exterior surface of a flexible optical fiber to bend the optical fiber towards a desired point may be utilized in other embodiments in accordance with the invention.

Figure 8:
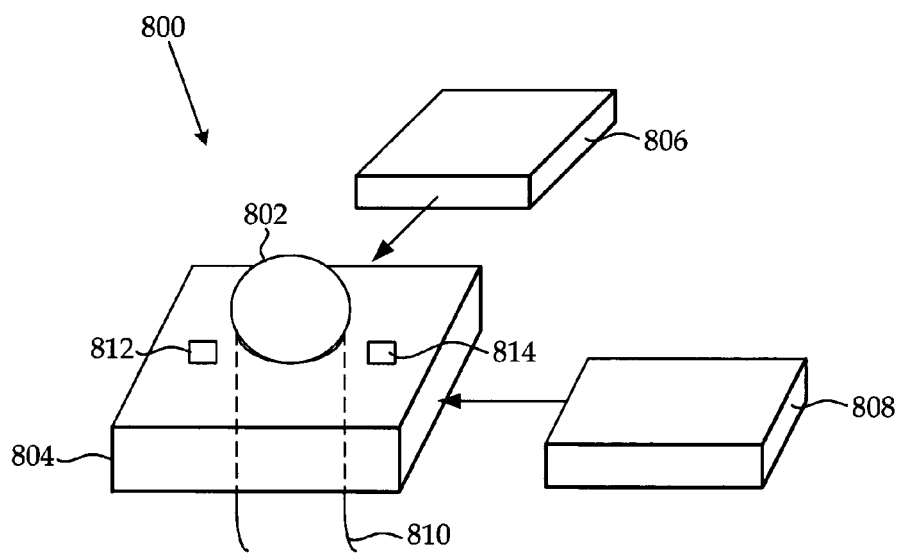
FIG. 8 illustrates a simplified perspective view of a second embodiment of a lens, support device, and fiber construction that may be implemented in the optical switch of FIG. 6.

FIG. 8 illustrates a simplified perspective view of a second embodiment of a lens, support device, and fiber construction that may be implemented in the optical switch of FIG. 6. Construction 800 includes a lens 802, support plate 804, positioning means 806, positioning means 808, and an optical fiber 810. Support plate 804, positioning means 806, and positioning means 808, form a support device in this embodiment in accordance with the invention. Positioning means 806 and 808 each include an actuator. A bend in the optical fiber 810 is created by applying the forces generated by one or both actuators against the support plate 804 connected to the fiber 810, causing the support plate 804 to rotate, or pivot, to a desired position. Rotation of the support plate 804 permits three-dimensional flexing of the fiber 810 and positioning of the lens 802. Sensors 812, 814 are constructed in the support plate 804. Embodiments in accordance with the invention, however, are not limited in application to the construction shown in FIG. 8. Any support device construction that permits a force to be applied to a support plate affixed or connected to a flexible optical fiber in order to create a bend in the fiber may be utilized in other embodiments in accordance with the invention.

Figure 9:
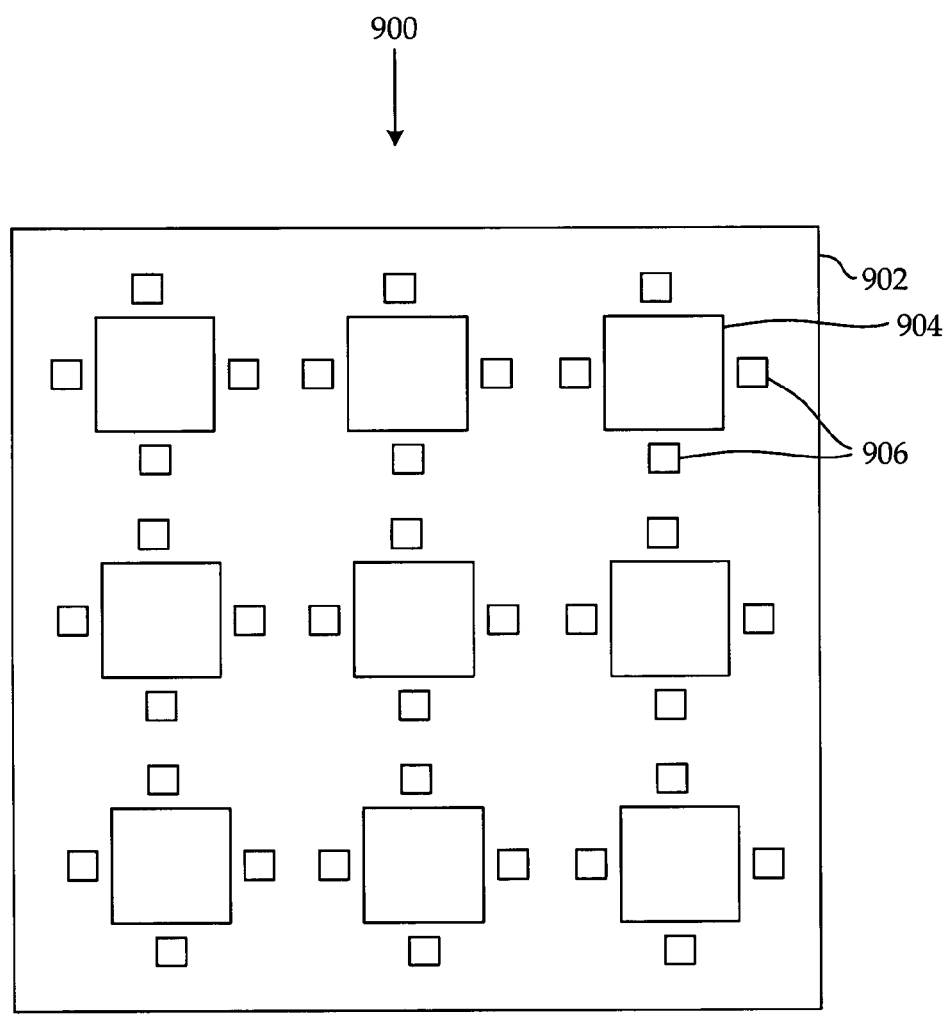
FIG. 9 is a simplified diagrammatic top view of an array of tilting mirrors illustrating a first arrangement for sensors in accordance with the invention.

Referring to FIG. 9, there is shown a simplified diagrammatic top view of an array of tilting mirrors illustrating a first arrangement for sensors in accordance with the invention. The array of tilting mirrors 900 is constructed or fabricated on a tile 902. Tile 902 includes a plurality of tilting mirrors 904, and surrounding each tilting mirror are four sensors 906. The four sensors 906 and a controller (not shown) determine a first distance along an axis (e.g. X axis) and a second distance along a second, perpendicular axis (e.g. Y axis) for adjusting a tilting mirror. In the FIG. 9 embodiment, the sensors 906 are depicted in the shape of a square. However, the sensors 906 may be configured in any desired shape, including, but not limited to, a circle, oval, and rectangle. Furthermore, embodiments in accordance with the invention are not limited in application to four sensors 906 adjacent each tilting mirror. Any number of desired sensors may be used to detect a beam of light. In other embodiments in accordance with the invention, a plurality of optical fibers or a plurality of support devices may be used in place of the plurality of tilting mirrors 904.

Figure 10:
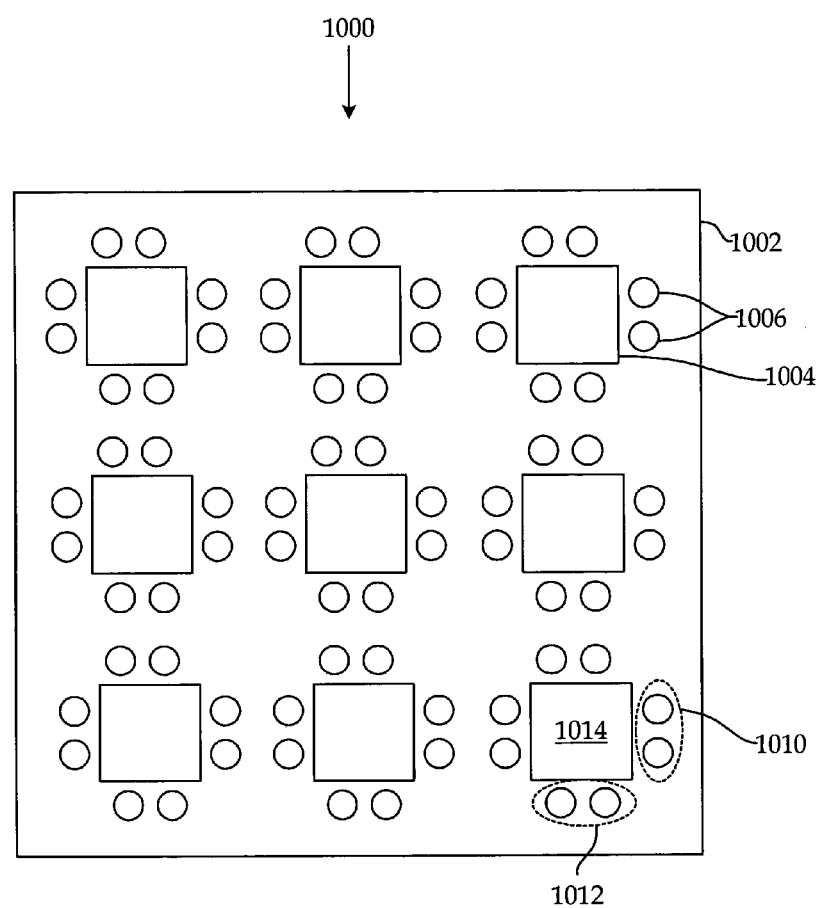
FIG. 10 is a simplified diagrammatic top view of an array of tilting mirrors depicting a second arrangement for sensors in accordance with the invention.

FIG. 10 is a simplified diagrammatic top view of an array of tilting mirrors depicting a second arrangement for sensors in accordance with the invention. The array of tilting mirrors 1000 is constructed or fabricated on a tile 1002. Tile 1002 includes a plurality of tilting mirrors 1004, and surrounding each tilting mirror are eight sensors 1006. The eight sensors 1006 and a controller (not shown) determine a distance along a first axis (e.g. X axis) and a second distance along a second, perpendicular axis for adjusting a tilting mirror. In the FIG. 10 embodiment, a pair of sensors on each side of a tilting mirror is combined logically to determine the proper adjustment for a tilting mirror. This permits the tilt of a tilting mirror to be more finely adjusted, since more data regarding the position of a beam of light relative to the desired position on a tilting mirror are obtained. For example, sensors pairs 1010 and 1012 may be used to determine how far the beam of light has moved toward the lower right hand corner of tilting mirror 1014.

Embodiments in accordance with the invention are not limited in application to using only the sensors adjacent an optical fiber, tilting mirror, or support device when aligning and maintaining alignment of an optical switch. Sensors adjacent neighboring optical fibers, tilting mirrors, or support devices may also be utilized to generate signals representative of the light hitting those sensors. In various applications this provides additional data concerning the position of a tilting mirror or bend in a fiber, thereby allowing for more discriminating adjustments to a tilting mirror or support device.

What is claimed is:

1. An optical switch comprising:
   an optical channel comprising:
      a first directing element and a second directing element for directing a first beam of light between an optical input and an optical output, wherein the first directing element directs the first beam of light toward the second directing element when the first beam of light is emitted from the optical input and the second directing element directs the first beam of light toward the optical output; and
      a first array of sensors positioned adjacent to the second directing element for receiving at least a portion of the first beam of light not striking the second directing element in order to align the first directing element based on an amount of light hitting each sensor in the first array.

2. The optical switch of claim 1, further comprising a controller for receiving from each sensor in the first array a signal representative of the amount of light hitting that sensor and for generating a first correction signal representative of an adjustment to the first directing element.

3. The optical switch of claim 2, further comprising a second array of sensors positioned adjacent to the first directing element for aligning the second directing element based on an amount of light hitting each sensor in the second array when the second directing element directs a second beam of light toward the first directing element after the second beam of light is emitted from the optical output.

4. The optical switch of claim 3, wherein the controller receives from each sensor in the second array a signal representative of the amount of light hitting that sensor and for generating a second correction signal representative of an adjustment to the second directing element.

5. The optical switch of claim 4, wherein the first array of sensors and the second array of sensors comprise a first array of optical to electrical converters and a second array of optical to electrical converters.

6. An optical switch comprising:
   an optical channel comprising:
      an optical input for receiving a beam of light;
      an optical output;
      a first directing element and a second directing element for directing the beam of light between the optical input and the optical output, wherein the first directing element directs the beam of light toward the second directing element when the beam of light is emitted from the optical input and the second directing element directs the beam of light toward the optical output; and
      a first array of sensors positioned adjacent to and peripherally surrounding the optical output for receiving at least a portion of the beam of light not striking an input end of the optical output in order to determine a position of the beam of light with respect to the input end of the optical output.

7. The optical switch of claim 6, further comprising a controller for receiving from each sensor in the first array a signal representative of an amount of light hitting that sensor and for generating a first correction signal representative of an adjustment to the second directing element.

8. The optical switch of claim 7, further comprising a second array of sensors positioned adjacent to the second directing element for determining a position of the beam of light with respect to the second directing element.

9. The optical switch of claim 8, wherein the controller receives from each sensor in the second array a signal representative of art amount of light hitting that sensor and for generating a second correction signal representative of an adjustment to the first directing element.

10. The optical switch of claim 9, wherein the first and array of sensors and the second array of sensors comprise a first array of optical to electrical converters and a second array of optical to electrical converters.

11. A method for aligning an optical switch, comprising the steps of:
    transmitting a first beam of light between an optical input and an optical output utilizing a first directing element and a second directing element to direct the first beam of light, wherein the first directing element directs the first beam of light toward the second directing element when the first beam of light is emitted from the optical input and the second directing element directs the first beam of light toward the optical output;
    detecting an amount of light not striking the second directing element and striking each sensor in a first array of sensors positioned adjacent to the second directing element; and
    generating a first correction signal representative of an adjustment to the first directing element based on the amount of light hitting each sensor in the first array of sensors.

12. The method of claim 11, further comprising the step of adjusting the first directing element using the first correction signal.

13. The method of claim 12, further comprising the steps of:
    transmitting a second beam of light between the optical output and the optical input utilizing the second directing element and the first directing element to direct the second beam of light, wherein the second directing element directs the second beam of light toward the first directing element when the second beam of light is emitted from the optical output and the first directing element directs the second beam of light toward the optical input;
    detecting an amount of light hitting each sensor in a second array of sensors positioned adjacent to the first directing element;
    generating a second correction signal representative of an adjustment to the second directing element based on the amount of light hitting each sensor in the second array of sensors; and
    adjusting the second directing element using the second correction signal.

14. The method of claim 13, wherein the first array of sensors and the second array of sensors comprise a first array of optical to electrical converters and a second array of optical to electrical converters.

15. The method of claim 12, further comprising the steps of:
    detecting an amount of light hitting each sensor in a third array of sensors positioned adjacent to the optical output;
    generating a third correction signal representative of an adjustment to the second directing element based on the amount of light hitting each sensor in the third array of sensors; and
    adjusting the second directing element using the third correction signal.

16. The method of claim 15, wherein the first array of sensors and the third array of sensors comprise a first array of optical to electrical converters and a third array of optical to electrical converters.

* * * * *